United States Patent
Loboz et al.

(10) Patent No.: US 7,689,690 B2
(45) Date of Patent: Mar. 30, 2010

(54) METHOD FOR THE EARLY INDICATION OF SERIALIZATION BOTTLENECKS

(75) Inventors: Charles Zdzislaw Loboz, West Ryde (AU); Jonatan Kelu, Granville (AU); Elgan Alcorn, Gladesville (AU)

(73) Assignee: Unisys Corporation, Blue Bell, PA (US)

( * ) Notice: Subject to any disclaimer, the term of this patent is extended or adjusted under 35 U.S.C. 154(b) by 404 days.

(21) Appl. No.: 11/794,136

(22) PCT Filed: Dec. 28, 2004

(86) PCT No.: PCT/US2004/044003

§ 371 (c)(1),
(2), (4) Date: Jun. 25, 2007

(87) PCT Pub. No.: WO2006/071231

PCT Pub. Date: Jul. 6, 2006

(65) Prior Publication Data

US 2007/0299968 A1    Dec. 27, 2007

(51) Int. Cl.
*G06F 15/173* (2006.01)
(52) U.S. Cl. ........................... 709/224; 709/203
(58) Field of Classification Search ................ 709/224
See application file for complete search history.

(56) References Cited

U.S. PATENT DOCUMENTS

| | | | | |
|---|---|---|---|---|
| 5,504,894 A * | 4/1996 | Ferguson et al. | ............... | 707/2 |
| 5,805,602 A * | 9/1998 | Cloutier et al. | ............. | 370/516 |
| 5,960,181 A * | 9/1999 | Sanadidi et al. | ............... | 703/21 |
| 6,311,144 B1* | 10/2001 | Abu El Ata | ..................... | 703/2 |
| 6,457,143 B1* | 9/2002 | Yue | .............. | 714/43 |
| 6,560,569 B1* | 5/2003 | Abu El Ata | ..................... | 703/2 |
| 7,317,706 B1* | 1/2008 | Hao et al. | ................... | 370/330 |
| 2003/0065762 A1* | 4/2003 | Stolorz et al. | ............. | 709/223 |
| 2003/0067913 A1* | 4/2003 | Georgiou et al. | ............ | 370/389 |
| 2005/0021530 A1* | 1/2005 | Garg et al. | .................. | 707/100 |
| 2006/0143496 A1* | 6/2006 | Silverman | ...................... | 714/4 |

OTHER PUBLICATIONS

Adaptive Algorithms for Managing a Distributed Data Processing Workload, J. Aman et al. 1997.*
International Search Report, Oct. 19, 2004.

* cited by examiner

*Primary Examiner*—Firmin Backer
*Assistant Examiner*—Patrick Nagel
(74) *Attorney, Agent, or Firm*—Robert P. Marley; Richard J. Gregson

(57) ABSTRACT

The present invention provides a method for identifying a serialization bottleneck in a computer system (FIG. 1). The method comprises the steps of providing statistical data with regard to the actual response time (FIG. 2) of a computing resource, providing statistical data with regard to an expected response time of the computing resource and applying a mathematical formula to the actual response time to derive a relationship between the actual and expected response time. The relationship between the expected response time and the actual response time provides an indication of the presence of a serialization problem in a computing system.

10 Claims, 2 Drawing Sheets

Figure 2
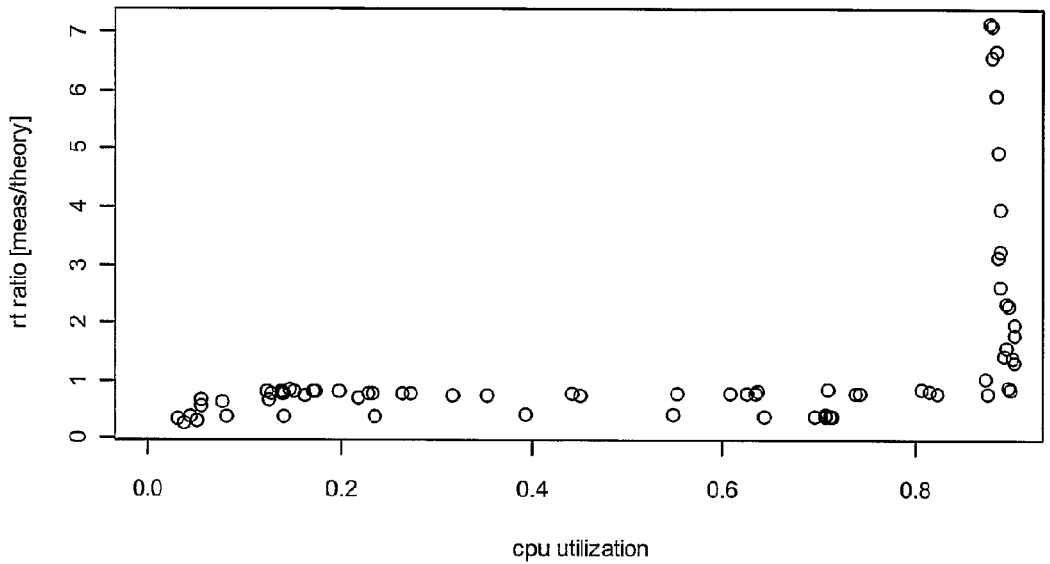
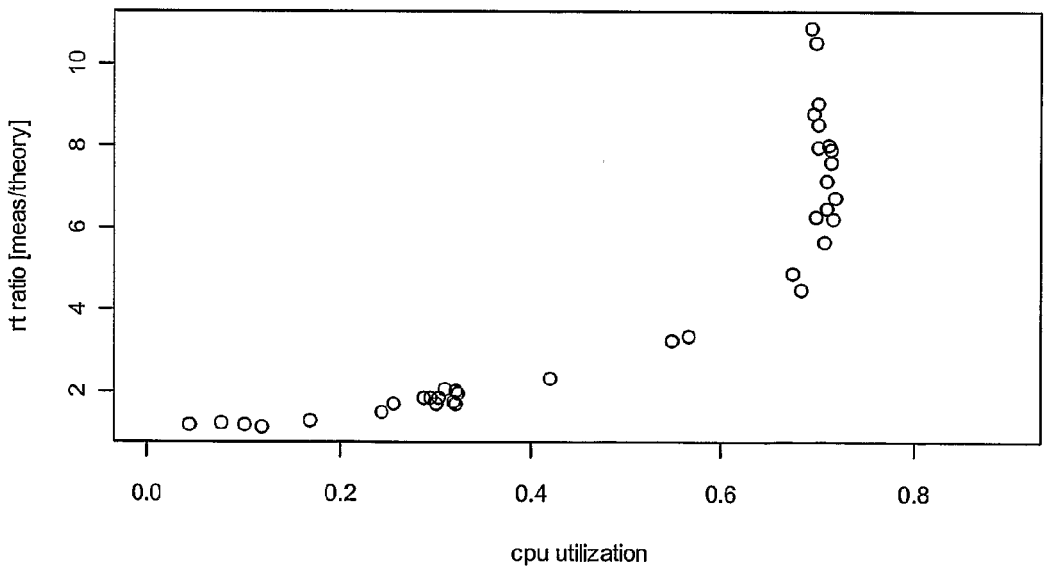
Figure 3

METHOD FOR THE EARLY INDICATION OF SERIALIZATION BOTTLENECKS

FIELD OF THE INVENTION

The present invention relates to the detection of serialisation bottlenecks in a computing system, and specifically, but not exclusively to the detection of software serialisation bottlenecks in transaction processing systems.

BACKGROUND OF THE INVENTION

An abstract representation of the system architecture of the software components of a transaction processing system in a computing system is shown in FIG. 1. A number of clients (that is, a number of users who submit transaction requests to the computing system) interact with a server process via a gateway process. It will be understood that in the present context, a "user" or "client" may denote a person engaging with a terminal or other input device to submit a transaction request, or it may denote another computing system engaging with a server to submit a transaction request, or it may denote a separate software module within the computing system which sends requests to a server process.

It will further be understood that the three software components termed "client", "gateway" and "server" may refer to a separate software modules or software applications, or may be integrated into a single module or application and that each of the three components may reside on the same item of hardware, on separate items of hardware, or any combination thereof.

The gateway process acts as an intermediary between the client and the server process. That is, the gateway performs the function of routing requests from a client to an appropriate server, and receives processed transactions from a server and re-routes the completed transaction to the appropriate client. In other words, the gateway functions as a "housekeeping" process.

The server processes are arranged to take a transaction request and carry out the appropriate operations necessary to fulfill the transaction request.

In the context of the present specification, the server process is used to denote a software process, not a hardware computing system or component. The server process may interact directly with any appropriate hardware. In FIG. 1, there is shown an abstract representation of a transaction processing system architecture. A server process is shown, which interacts with a database to obtain and store relevant data. However, the server process may also interact with other hardware components, such as a central processing unit, a network interface, a printer, or any other suitable device.

In a transaction processing system such as the type shown in FIG. 1, a "software bottleneck" may be created in certain circumstances. A software bottleneck occurs where transactions take a relatively long time to be processed, due to an inefficiency in the design of the architecture of a computing system, or due to an error or inefficiency in the implementation of a particular architecture.

A simple type of software bottleneck may occur where a transaction processing system is designed with only a small or limited number of server processes. Server processes are generally single threaded, so only one request may be processed by each server process at any given time, which limits the speed at which a transaction request can be processed. Therefore, if there are many transaction requests and few server processes, a large number of transaction requests will become queued, resulting in a bottleneck. The bottleneck is termed a "software bottleneck" due to the fact that the bottleneck is caused by a deficiency in the software design or implementation.

In the simple example given, the bottleneck may be ameliorated by simply adding more server processes.

However, software bottlenecks may also be introduced at a more fundamental level. For example, a programming error, such as the incorrect or inappropriate use of semaphores may result in the introduction of a software bottleneck. Large scale transaction processing systems and/or applications are generally multi threaded, which results in a need to synchronise between different software modules. In order to prevent clashes between different software modules, multitasking systems provide a set of mechanisms (system calls) which allow a process to gain exclusive access to a system resource (eg. a serial port, a physical disc, etc.).

In the systems described herein, the mechanism by which a system gains exclusive access to a system resource is called a semaphore. In other computing systems, they may variously be called locks, mutexes, or critical regions.

It will be understood that the term semaphore is used herein solely as a useful abbreviation for any type of mechanism which allows a process to gain exclusive access to a system resource, and use of the term should not be construed as limiting the invention or any embodiment of the invention to a particular type of computer hardware, operating system, or software application.

It is quite common for software engineers or programmers to introduce serialisation problems unwittingly by unwise use of synchronisation code (ie. semaphores or similar entities) at incorrect places in the code. Alternatively, software engineers may use semaphores or similar entities in a sub-optimal manner.

Such errors or suboptimal program code do not affect the logic of the application, as all transactions continue to be logically valid. The errors simply decrease the overall system processing rate, and in many cases, such effects will only appear under high loads.

In the case where a software bottleneck is primarily caused by inefficient programming, it is not easily detected by the end user or the system administrator of the computing system, as it's effects do not become apparent at normal to medium operating loads. Even at high operating loads, as it is common for transaction processing systems to slow considerably, such serialisation problems are commonly misdiagnosed as being due to inadequate processing ability.

In response to the perceived inadequate processing ability, some system administrators will increase the number of server processes or database connections to ameliorate the problem. Such a solution, while seeming to ameliorate the problem, only serves to temporarily mask the problem. Furthermore, increasing the number of server processes places an extra burden on the computing system hardware, which may lead to further problems, or may not be practical, as the ability of the hardware to handle additional server processes may also be limited. For example, there may not be adequate memory or network bandwidth available to support a larger number of server processes or database connections.

An ideal solution would be to decouple the incorrectly placed semaphore calls, but such incorrect code must be brought to the attention of the software engineer. As the maintenance of incorrect code is a costly exercise, this solution is generally not undertaken without the positive identification of a software bottleneck.

SUMMARY OF THE INVENTION

In a first aspect, the present invention provides a method for identifying a serialisation bottleneck in a computer system, comprising the steps of, providing an actual response time of a computing resource, providing an expected response time of the computing resource, and comparing the actual response time and the expected response time to derive a relationship between the actual and expected response time, whereby the relationship between the expected response time and the actual response time provides an indication of the presence of a serialisation problem in a computing system.

The present invention advantageously provides a method which allows a system administrator or other computing professional to determine whether a particular computing system or software system is subject to a serialisation bottleneck by comparing actual response, times with expected response times.

The step of deriving the relationship may further comprise dividing the actual response time by the expected response time to produce a ratio of the actual response time to the expected response time.

A plurality of actual response times and expected response times for a computing resource may be provided, each of the plurality of actual and expected response times being derived when the computing response is subjected to a different load, and comparing the actual response time and expected response time at each respective load.

The ratio of the actual response time and the expected response time may be plotted on a graph against the load on the computing resource, to provide a visual representation of the relationship between the ratio and the load.

The method may further comprise the preliminary step of calculating the probability of a transaction request being queued before the request is processed.

The probability of queuing may be calculated utilising the mathematical formula:

$$p_q = \sum_{n=1}^{c-1} \frac{cL^n}{n!} * \frac{cL^c}{c!(1-L)}$$

where $p_q$ is the probability of a transaction being queued; c is the total number of computing resources (expressed as an integer) and L is the utilisation of each computing resource.

The expected response time may be calculated utilising the mathematical formula:

$$E_r = d * \left(1 + \frac{P_q}{c*(1-L)}\right)$$

where $E_r$ is the expected response time, $p_q$ is the probability of a transaction being queued; c is the total number of computing resources (expressed as an integer); L is the utilisation of each computing resource; and d is the average time taken for a transaction to be processed.

In a second aspect, the present invention provides a system for identifying a serialisation bottleneck in a computer system, comprising, means for providing an actual response time of a computing resource, means for providing an expected response time of the computing resource, and means comparing the actual response time and the expected response time to derive a relationship between the actual and expected response time, wherein the relationship between the expected response time and the actual response time provides an indication of the presence of a serialisation problem in a computing system.

In a third aspect, there is provided a computer program arranged, when loaded on a computing system, to implement the method in accordance with a first aspect of the invention.

In a fourth aspect, the present invention provides a computer readable medium providing a computer program in accordance with a third aspect of the invention.

DETAILED DESCRIPTION OF THE DRAWINGS

Features of the present invention will be presented in a description of an embodiment thereof, by way of example, with reference to the accompanying drawings, in which:

FIG. 2 is a graph display generated by the application of an embodiment of the present invention, and displaying the absence of a serialisation bottleneck; and FIG. 3 is a graph generated by the application of an embodiment of the present invention, and displaying the presence of a software serialisation bottleneck.

DESCRIPTION OF A SPECIFIC EMBODIMENT

Figure 1:
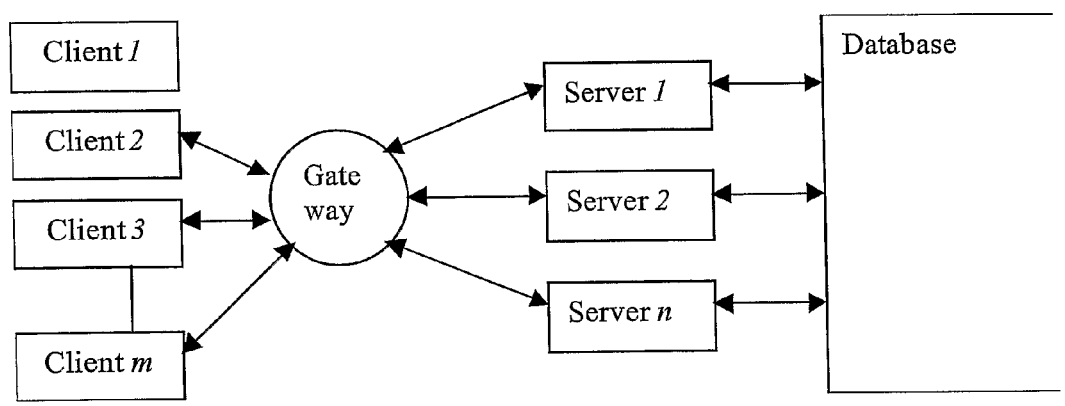
FIG. 1 illustrates a transaction processing system which may be analysed by an embodiment of the present invention to determine the presence of a serialisation bottleneck.

A software application known as Enterprise Application Environment™ (EAE) utilises the architectural model described in FIG. 1. The Enterprise Application Environment is a fourth generation programming environment developed by Unisys™ Corporation. Enterprise Application Environment is generally utilised to build enterprise transaction processing systems. That is, computing systems which are arranged to execute many transactions concurrently. One example of an application of the Enterprise Application Environment could be a banking system which processes and tracks all computer transactions carried out by a bank. Another example could be an insurance system which processes and tracks all computer transactions carried out by an insurance company. Such systems generally comprise a large number of disparate components that must be arranged to handle a plurality of concurrent transaction requests. In such an environment, an architecture such as the one shown in FIG. 1 is the most appropriate.

Embodiments of the present invention are particularly useful when analysing software applications created by or developed with the Enterprise Application Environment. However, many other computing systems utilise a similar architecture, so embodiments of the present invention may find use in other analogous applications. For example, a web server functions in a very similar manner to the gateway shown in FIG. 1, the client being a user accessing the web server through a web browser, and the server processes being processes which locate and "serve" Web Pages.

The present invention, in at least a preferred embodiment, provides a methodology and a system for analysing and detecting software serialisation bottlenecks. In many practical situations, serialisation bottlenecks are extremely difficult to diagnose, as they generally manifest as degradation in the overall performance or throughput of a transaction processing system. As degradation of the performance of a computing system may be caused by a litany of factors, a programmer or system administrator cannot, using conventional techniques, determine that a serial bottleneck is affecting system performance.

A bottleneck is the result of the unnecessary queuing of transaction requests due to inherent limitations in either the system architecture and/or the software application. As described in the "Background of the Invention" section of the present specification, this may be due to a deficiency of server processes in a transaction processing system, or alternatively due to an inherent inefficiency in the implementation of the software application. For example, an application may contain incorrectly utilised semaphores, or the application may contain an inherently limited memory allocation algorithm.

Therefore, software bottlenecks are very difficult to diagnose, as the only indicator of a software bottleneck is a higher response time, and the cause of the software bottleneck may lie "deep" in the system.

As is known to a person skilled in the art, a higher response time may also be the caused by a myriad of other common conditions in a computing system. For example, if a transaction request requires a large amount of CPU or disk time, the response time will be increased. In another more subtle example, the CPU or disk time required for a transaction may be increased under high load, as the total administration costs for management of queues, caches, and waits will be increased under a high load. Therefore, higher response time is only a very crude and unreliable indicator of a possible software bottleneck.

Moreover, routine identification of a software bottleneck is difficult since software bottlenecks manifest themselves only under high load conditions, and are invisible at low to medium load conditions. As the response time for a transaction request increases under a higher load, such increases in response time are generally interpreted as the effect of hardware system overload (for example, high CPU and/or I/O utilisation and transaction request queuing for these resources). As a corollary, transaction processing systems are generally only placed under high load during peak hours, not throughout the entire day. During peak hours, system administrators may be unwilling to run diagnostic software applications, as the use of such software applications may further degrade application performance.

Therefore, a worsening of the response time in peak hours is generally ascribed to hardware overload. As such, software bottlenecks may go unnoticed for a long period of time. Many computing systems continue to operate at sub-optimal performance, not due to inadequate hardware, but due to a hidden software serialisation problem.

In one embodiment, the present invention provides a method of determining the existence of a software bottleneck. This method involves the steps of measuring the number of transactions and the average response time of transactions submitted to the transaction processing systems within a given time interval whilst concurrently measuring relevant computing resource usage characteristics (for example, CPU utilisation, disk utilisation and network traffic). Once the data is gathered, the data is utilised to compute the average per transaction usage of computing resources, based on the usage data per transaction. Furthermore, the expected response time is computed utilising a formula which provides the expected response time. The formula does not take into account software bottlenecks. The actual response time is then compared against the expected response time, by, for example, determining the ratio between the two values.

Any significant divergence between the expected response time and the actual response time may signal the presence of a software bottleneck. This is particularly the case where the divergence between the expected response time and the actual response time grows as the system load increases.

The abovementioned methodology is particularly useful when large sample sets of data are gathered. This is because the methodology is statistical in nature. Individual response times for transactions may vary widely, as may resource usage for each individual transaction. Therefore, for the abovementioned method to provide accurate results, a statistically significant number of transaction resource usage and average response times must be collected, and the average values must be supplied to the formula.

In one embodiment, the formula utilised to calculate the expected response time may be found in many text books on queuing systems or computer performance. For example, see Leonard Klienrock, *Queuing Systems*, Volume 1: *Theory*, John Wiley & Sons (1975), pages 527-531.

The formula, given in two parts, is shown below as Equations 1 and 2.

In order to calculate the expected response time ($E_r$, see equation 2), the probability of a transaction becoming queued must first be calculated, by utilising Equation 1.

$$p_q = \sum_{n=1}^{c-1} \frac{cL^n}{n!} * \frac{cL^c}{c!(1-L)} \quad \text{Equation 1}$$

In equation 1, the probability of transactions being queued $p_q$ is the sum of the series from n=1 to c−1, where c is the number of server processes (expressed as an integer) of the equation shown above, where L is the total processor utilisation expressed as a fraction (ie. a number between 0.0 and 1.0, where 0.0 represents no utilisation, and 1.0 represents 100% or full utilisation). $P_q$, the probability of queuing, is also expressed as a fraction between 0.0 and 1.0, where 0.0 represents zero probability of transactions being queued, and 1.0 represents a 100% certainty that transactions will be queued).

Once the probability of queuing has been determined, then the expected response time may be calculated utilising the formula in equation 2.

$$E_r = d * \left(1 + \frac{P_q}{c*(1-L)}\right) \quad \text{Equation 2}$$

In equation 2, $E_r$ is the expected theoretical response time expressed in the same unit of time as "d", the expected processing time for the transaction (commonly expressed in milliseconds).

As can be seen from Equation 2, if the probability of queuing ($P_q$) increases and/or the processor utilisation (L) increases, the expected response time ($E_r$) also increases.

An embodiment of present invention will now be described with reference to an example, as illustrated by the graphs in FIGS. 2 and 3.

In the example, a Java™ Virtual Machine, which is an application arranged to execute Java applications, was deployed on an eight processor server with various operation mixes. It is known that the Java Virtual Machine (in one implementation) utilises a memory allocation system which includes a "heap" onto which all objects are placed. In circumstances where a large number of objects are generated, the use of a "heap" memory allocation system may result in the creation of a serialisation bottleneck.

Creating a multi-threaded Java application produces a large number of objects per unit time. Producing a large number of objects per unit time will, under certain conditions, induce a serialisation bottleneck in the memory allocation mechanism utilised by the Java virtual machine. Therefore, the Java virtual machine provides a good basis to create an example of how an embodiment of the present invention would operate.

In the example, two different types of simulated tests were employed. The first test produced many objects per interaction, in order to induce a serialisation bottleneck in the Java virtual machine. The second test produced only a small number of objects per interaction, in order to avoid the creation of a serialisation bottleneck.

Both tests were executed across a range of processor loads, from minimum processor load (ie. close to zero) to maximum processor load (ie. the maximum that could be achieved before the Java virtual machine response time slowed by at least an order of magnitude).

For each test, the CPU time per transaction was measured and the actual response time per transaction was measured for each processor load. Then, utilising the measured CPU time per transaction, the theoretical expected response time was also calculated.

The ratio of the actual response time to the expected response time was calculated, and was plotted against the processor load to produce a graph.

As seen in FIGS. 2 and 3, the CPU utilisation (expressed as a fraction between 0.0 and 1.0) is displayed on the horizontal axis, and the response time ratio is displayed on the vertical axis. The response time ratio represents the measured response time divided by the expected response time.

When viewing FIG. 2, it is apparent to a viewer that the ratio between the measured response and the threatical response time stays between the values of zero and one across a wide range of processor loads. That is, the measured response time is approximately equal to or less than the expected response time. At some instances, the measured response time is less than the expected response time due to optimisation techniques which are not accounted for in the formula utilised to calculate the expected response time.

For example, if some transaction requests are held in cache memory, subsequent transaction requests of the same type may be processed more quickly than the average expected response time, thereby resulting in an actual response time that is lower than the expected response time. As the system load approaches and exceeds 95%, the actual response time increases sharply, even though the expected response time continues to rise in a linear fashion. This is an expected result, as a so-called "grid lock" tends to occur as the processors reach their maximum utilisation. Such an event is not characterised as a software bottleneck, as it is expected that actual response time increase sharply as full utilisation is approached. Therefore, FIG. 2 demonstrates that no serialisation bottleneck exists.

FIG. 3 shows a resultant graph when a Java application producing a large number of objects per interaction was run on the same test system. Once again, the actual response time was measured for varying processor loads, and the expected response time was calculated for corresponding varying processor loads, utilising the same formula. The ratio of the actual response time versus the expected response time was calculated for each processor load, and the results were plotted in the graph shown in FIG. 3. As can be seen from the graph, the ratio between the measured or actual response time and the expected response time remains at approximately one (ie. the actual response time matches the expected response time) for low processor utilisation (less than approximately 0.2 or 20% utilisation). However, once the CPU utilisation passes 0.2 (20%), the actual response time begins to grow at a faster rate than the expected response time, which can be clearly seen for utilisation values between approximately 0.3 to 0.7 (30% to 70%). However, at this point the ratio begins to grow, such that at 60% CPU utilisation, the measured response time is approximately 4 times higher than the expected response time. At 75% CPU utilisation, the ratio grows very steeply. In other words, the computing system cannot be loaded over 75% CPU utilisation. As such, it is apparent from FIG. 3 that a software serialisation bottleneck exists in the system as a bottleneck becomes apparent at system loads above 20%.

Therefore, an embodiment of the present invention allows an operator to detect software bottlenecks, even at low CPU loads.

It will be understood that software bottlenecks do not only affect transaction processing systems, but may effect other aspects of a computing system. While the above example utilises the Java Virtual Machine, developed by Sun Microsystems™, which is a system that is limited by the number of memory allocations and deallocations it can perform, since various threads must obtain memory from the same memory pool.

In other words, memory must be obtained in a serial fashion, through a central memory allocation mechanism. However, the central memory allocation mechanism in the Java virtual machine behaves in a manner that is analogous to the gateway shown in FIG. 1. The threads may be modelled as the client (again see FIG. 1) and the memory is analogous to the server processes and the database.

Therefore, the methodology and system described in the present application may be applied to many different system architectures. Indeed, embodiments of the present invention may be applied to almost any system where transactions are queued for any reason.

The invention claimed is:
1. A method for identifying a serialization bottleneck in a computer system, comprising the steps of:
  calculating the probability of a transaction request being queued before the transaction request is processed utilizing the mathematical formula:

$$p_q = \sum_{n=1}^{c-1} \frac{cL^n}{n!} * \frac{cL^c}{c!(1-L)}$$

where $p_q$ is the probability of a transaction being queued; c is the total number of computing resources (expressed as an integer) and L is the utilization of each computing resource;
  providing an actual response time of a computing resource;
  providing an expected response time of the computing resource, and comparing the actual response time and the expected response time to derive a relationship between the actual and expected response time, whereby the relationship between the expected response time and the actual response time provides an indication of the presence of a serialization problem in a computing system.

2. A method in accordance with claim 1, wherein the expected response time is calculated utilizing the mathematical formula:

$$E_r = d * \left(1 + \frac{p_q}{c*(1-L)}\right)$$

where $E_r$ is the expected response time, $p_q$ is the probability of a transaction being queued; c is the total number of computing resources (expressed as an integer); L is the utilization of each computing resource; and d is the average time taken for a transaction to be processed.

3. A system in accordance with claim 1, wherein the expected response time is calculated utilizing the mathematical formula:

$$p_q = \sum_{n=1}^{c-1} \frac{cL^n}{n!} * \frac{cL^c}{c!(1-L)}$$

where $E_r$ is the expected response time, $p_q$ is the probability of a transaction being queued; c is the total number of computing resources (expressed as an integer); L is the utilization of each computing resource; and d is the average time taken for a transaction to be processed.

4. A method in accordance with claim 1, the step of deriving the relationship further comprising dividing the actual response time by the expected response time to produce a ratio of the actual response time to the expected response time.

5. A method in accordance with claim 4, further comprising the step of providing a plurality of actual response times and expected response times for a computing resource, each of the plurality of actual and expected response times being derived when the computing response is subjected to a different load, and comparing the actual response time and expected response time at each respective load.

6. A method in accordance with claim 5, wherein the ratio of the actual response time and the expected response time is plotted on a graph against the load on the computing resource, to provide a visual representation of the relationship between the ratio and the load.

7. A data processing system for identifying a serialization bottleneck in a computer system implemented using software executing within a computing system, comprising:
means to calculate the probability of a transaction request being queued before the request is processed, wherein the probability of queuing is calculated utilizing the mathematical formula:

$$E_r = d * \left(1 + \frac{p_q}{c*(1-L)}\right)$$

where $p_q$ is the probability of a transaction being queued; c is the total number of computing resources (expressed as an integer) and L is the utilization of each computing resource;
means for providing an actual response time of a computing resource, means for providing an expected response time of the computing resource, and means comparing the actual response time and
the expected response time to derive a relationship between the actual and expected response time,
wherein the relationship between the expected response time and the actual response time provides an indication of the presence of a serialization problem in a computing system.

8. A system in accordance with claim 7, wherein the means for deriving the relationship further comprises means for dividing the actual response time by the expected response time to produce a ratio of the actual response time to the expected response time.

9. A system in accordance with claim 8, further comprising means for providing a plurality of actual response times and expected response times for a computing resource, each of the plurality of actual and expected response times being derived when the computing response is subjected to a different load, wherein the means for comparing the actual response time and expected response time compares the times at each respective load.

10. A system in accordance with claim 9, further comprising means to plot the ratio of the actual response time and the expected response time against the load on the computing resource, to provide a visual representation of the relationship between the ratio and the load.

* * * * *